United States Patent [19]
Klim

[11] Patent Number: 5,235,602
[45] Date of Patent: Aug. 10, 1993

[54] SYNCHRONOUS/ASYNCHRONOUS I/O CHANNEL CHECK AND PARITY CHECK DETECTOR

[75] Inventor: Peter J. Klim, Deerfield Beach, Fla.

[73] Assignee: International Business Machines Corporation, Armonk, N.Y.

[21] Appl. No.: 714,127

[22] Filed: Jun. 11, 1991

[51] Int. Cl.[5] .............................................. G06F 11/10
[52] U.S. Cl. ................................. 371/49.1; 371/29.5
[58] Field of Search ................ 371/49.1, 49.2, 51.1, 371/29.5; 395/275

[56] References Cited

U.S. PATENT DOCUMENTS

| | | | |
|---|---|---|---|
| 3,727,142 | 4/1973 | De Sipio . | |
| 3,790,881 | 2/1974 | Smith . | |
| 4,530,095 | 7/1985 | Ryan | 371/49.2 |
| 4,962,501 | 10/1990 | Byers et al. | 371/51.1 |
| 4,984,213 | 1/1991 | Abdoo . | |
| 4,991,085 | 2/1991 | Pleva . | |
| 5,033,050 | 7/1991 | Murai | 371/49.1 |

Primary Examiner—Vincent P. Canney
Attorney, Agent, or Firm—Stephen A. Terrile; Douglas R. McKechnie

[57] ABSTRACT

An improved I/O channel check and parity check detector includes two similar detection paths each of which includes a check detector, a glitch reject circuit, and a read back register. A memory parity error causes a bit to be set in the read back register. An I/O channel check sets another bit in a read back register provided a memory parity error has not been signalled. If such signal occurs, the channel check is rejected. The read back bits are read through a port allowing the system to determine the source of error.

7 Claims, 6 Drawing Sheets

SYNCHRONOUS/ASYNCHRONOUS I/O CHANNEL CHECK AND PARITY CHECK DETECTOR

FIELD OF THE INVENTION

This invention relates to the field of data processing, and, more particularly to a new synchronous/asynchronous I/O Channel Check and parity check detector.

BACKGROUND OF THE INVENTION

In existing PS/2 personal computer systems, the minimum pulse width for reliably detecting an I/O channel check or parity error is 100 ns. Micro Channel architecture now supports synchronous I/O channel check requiring the detection of pulses shorter than 100 ns. The detection circuit of the invention acquires pulses independently of the system clock, and allows a minimum pulse width for I/O channel check to be as low as approximately 10 ns, while simultaneously rejecting pulses below such minimum pulse width.

The invention is able to detect exceptions for both synchronous and asynchronous reporting of parity errors and I/O channel checks. Previous detector designs in earlier PS/2 computers did not permit detection of pulses of less than 100 ns duration on either input and were not capable of rejecting any glitches. Hence, exceptions by synchronous reporting could not be detected reliably. The previous designs relied on a 20 MHz clock to latch the inputs. With the invention, pulses of duration as low as 10 ns may now be specified, designed and detected reliably with no dependence on any clock. All pulses with larger than minimum width are now detected reliably. The minimum pulse width is determined by the internal logic of the chip and to a small extent by the physical layout. Glitch rejection is part of the new design. Since the Parity Error signal from main memory drives the Micro Channel I/O Channel Check signal, the invention also supports both methods of reporting exceptions. Therefore, the detection circuits for both inputs are designed in similar fashion.

SUMMARY OF THE INVENTION

One of the objects of the invention is to provide an improved I/O channel check and parity check detector which is capable of detecting short pulses of less than 100 nanoseconds while rejecting glitches.

Another object of the invention is to provide an improved I/O channel check and parity check detector which detects exceptions for both synchronous and asynchronous reporting of I/O channel check and memory parity error signals.

Briefly, in accordance with the invention, an improved I/O channel check and parity check detector includes two similar detection paths each of which includes a glitch reject circuit, and a read back register. One path includes a channel check detector that receives error signals for both a parity error and a channel check. The other path includes a parity error detector which receives only the parity error signal. The detectors have outputs connected to the glitch reject circuits which input into the read back registers whereby input pulses of less than a minimum width are rejected as glitches.

DRAWINGS

Other objects and advantages of the invention will be apparent from the following description taken in connection with the accompanying drawings wherein.

DETAILED DESCRIPTION

Figure 1:
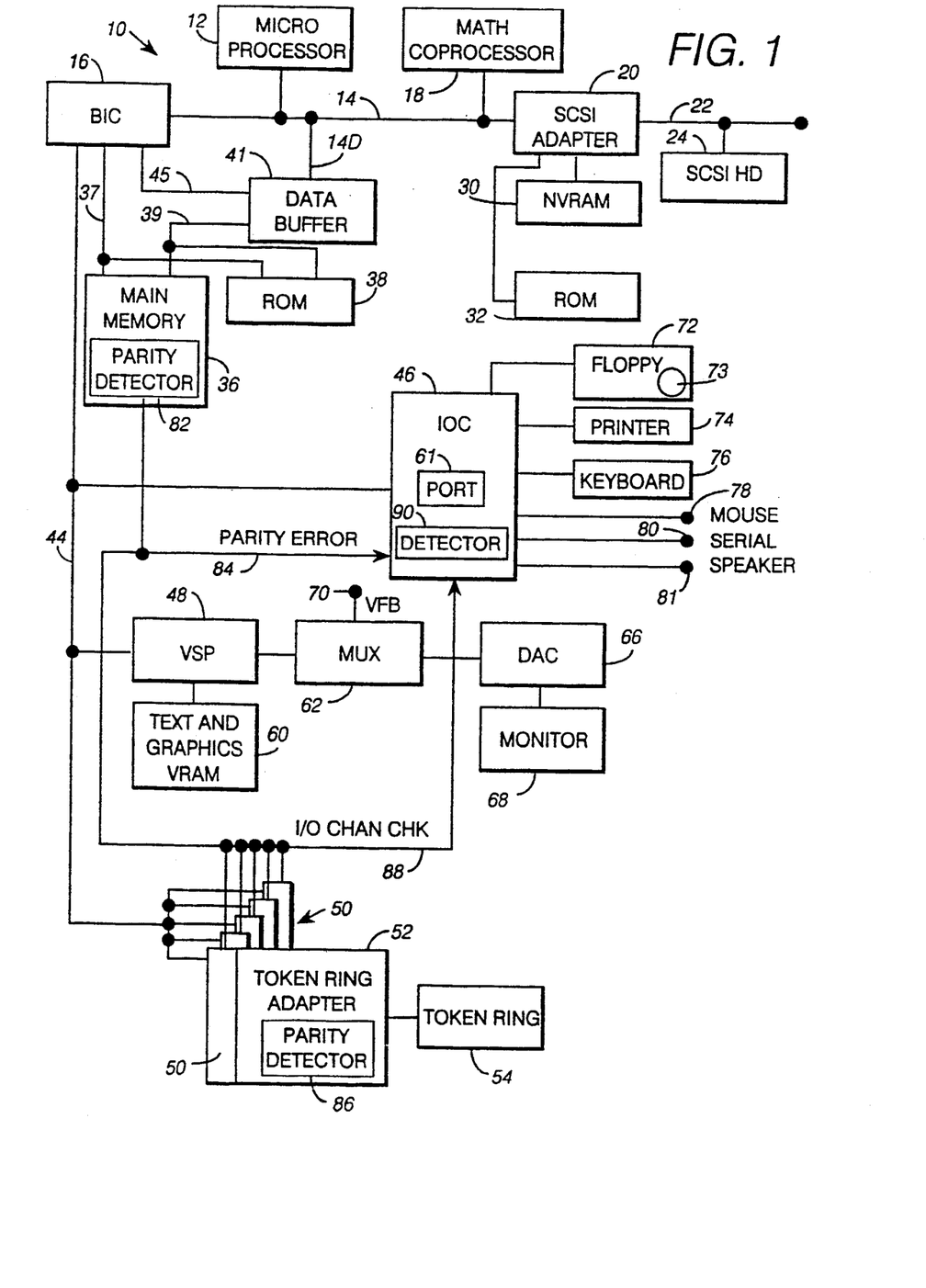
FIG. 1 is a block diagram of a data processing system embodying a preferred form of the invention.

Referring now to the drawings, and first to FIG. 1, there is shown an exemplary data processing system comprising a personal computer 10 operable under an operating system such as PC DOS or OS/2 to execute application programs. Computer 10 comprises a microprocessor 12 connected to a local bus 14 which, in turn, is connected to a bus interface controller (BIC) 16, a math coprocessor 18, and a small computer system interface (SCSI) adapter 20. Microprocessor 12 is preferably one of the family of 80xxx microprocessors, such as an 80386 microprocessor, and local bus 14 includes conventional data, address, and control lines conforming to the architecture of such processor. Adapter 20 is also connected to a SCSI bus 22 which is connected to a SCSI hard drive (HD) 24 designated as the C:drive, the bus also being connectable to other SCSI devices (not shown). Adapter 20 is also connected to a NVRAM 30 and to a read only memory (ROM) 32.

BIC 16 performs two primary functions, one being that of a memory controller, including a direct memory access (DMA) controller, for accessing a main memory 36 and a ROM 38. Main memory is a dynamic random access memory (RAM) that comprises one or more single, in-line, memory modules (SIMMS) and stores programs and data for execution by microprocessor 12 and math coprocessor 18. An address and control bus 37 connects BIC 16 with memory 36 and ROM 38. A data bus 39 connects memory 36 and ROM 38 with a data buffer 41 that is further connected to data bus 14D of bus 14. Control lines 45 interconnect BIC 16 and data buffer 41.

The other primary function of BIC 16 is to interface between bus 14 and an I/O bus 44 designed in conformance with Micro Channel architecture. Bus 44 is further connected to an input/output controller (IOC) 46, a video signal processor (VSP) 48, and a plurality of Micro Channel connectors or slots 50. A token ring adapter 52 is mounted in one of slots 50 and is further connected to a token ring 54. VSP 48 is further connected to a video RAM (VRAM) 60 and a multiplexor (MUX) 62. VRAM 60 stores text and graphic information for controlling what appears on the screen of a monitor 68. MUX 62 is further connected to a digital to analog converter (DAC) 68 and to a connector or terminal 70 that is connectable to a video feature bus (VFB). DAC 66 is connected to monitor 68 that provides a conventional output screen or display for viewing by a user.

IOC 46 controls operation of plurality of I/O devices including a floppy disc drive 72 designated as the A:-drive, a printer 74, and a keyboard 76. Drive 72 comprises a removable floppy disc 73. IOC 46 also is connected to a mouse connector 78, a serial port connector 80, and a speaker connector 81 which allow various optional devices to be connected into the system. IOC 46 also includes a programmable peripheral controller port 61 and a detector 90. Port 61 included a register having a plurality of bits two of which, when set, provide enabling signals +EN I/O CHAN CHK and +EN PAR CHK used by detector 90, in the manner described hereinafter.

Main memory 36 also includes a parity detector 82 that is operative when a parity error is detected in the transmission of data to and from the memory, to transmit a PARITY ERROR signal on line 84 to IOC 46. Adapter 52 also includes a parity detector 86 for detecting parity errors in the transmission of data to and from the adapter and transmitting an I/O CHAN CHK signal on line 88 to IOC 46. IOC 46 includes a detector 90 that receives both of such signals. The PARITY ERROR signal is also transmitted on line 84 to connectors 50 to notify any bus master connected thereto of a memory parity error.

Detector 90 is designed to support asynchronous I/O Channel Check signals which activate I/O Channel Check line 88 and keeps it active until it is cleared by a system master, i.e., cpu, DMA controller, or bus master (not shown). Thus, the system master must ignore I/O Channel Check while collecting information to determine the source of the I/O Channel Check. To overcome the inability of the system master to detect additional exceptions, while it interrogates registers to determine the source of the exception, synchronous channel check was architected into the system. This method pulses the I/O Channel Check line, and the system master may detect additional exceptions immediately after clearing read back bits in Port 61. When IOC 46 detects an I/O Channel Check or Parity Error, it sets read back bits, as described below, if I/O Channel Check and/or Parity Error have been enabled by a previous write operation to Port 61. Subsequently, an NMI output is activated signalling to the processor that an exception occurred. An active Parity Error signal from the planar of the computer drives an active I/O CHANNEL CHK signal to the MC connectors. Thus, both inputs to IOC 46 separate local memory parity error information from Micro Channel error information. When the circuitry detects an I/O Channel Check and a Parity Error simultaneously, it decodes it only as a Parity Error. When detector 90 sees an I/O Channel Check and no Parity Error, it decodes an I/O Channel Check error. Thus, the source of the exception may clearly be identified by the system master when Port 61 register is read. I/O Channel Check and Parity Error detectors may not detect any additional exceptions until their respective read back bits have been cleared.

Figure 2:
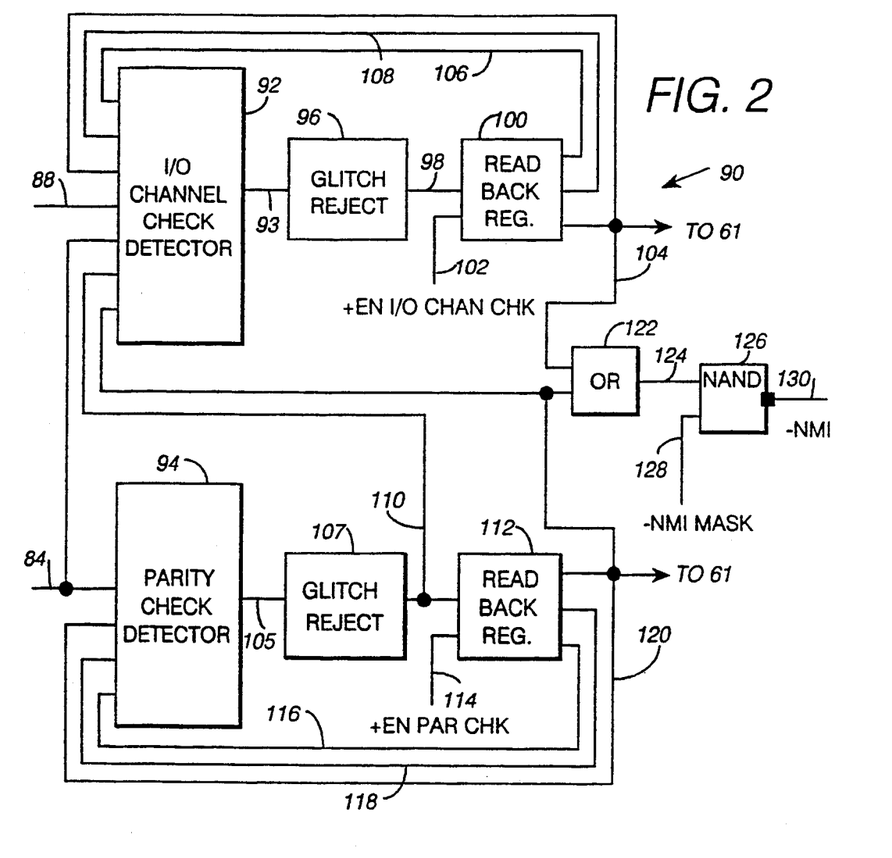
FIG. 2 is a more detailed block diagram of a detector shown in FIG. 1.

Details of detector 90 will now be discussed relative to FIGS. 2-5. For simplicity of presentation, LSSD test circuits, B and C clocks, and the initial reset have been omitted from the diagrams. Also, in such figures, the blackened square input and output symbols represent inverted signals. Also, the logic signals use "+" and "−" prefixes to signify positive and negative active signals. Referring first to FIG. 2, detector 90 includes an I/O channel check detector 92 and a parity error detector 94. Detector 92 is connected to line 88 to receive the I/O CHAN CHK signal, along with other inputs, and to an output line 93 that is further connected as an input in a glitch reject circuit 96. Output line 98 of circuit 96 is connected to an input of read back register 100, which has three output lines 104, 106, and 108 connected as feedback lines to inputs of detector 92. Register 100 also has an input line 102 for receiving an +EN I/O CHAN CHK signal from port 61. Before proceeding with further discussion of FIG. 2, a description of details of elements 92, 96, and 100 is first provided.

Figure 3:
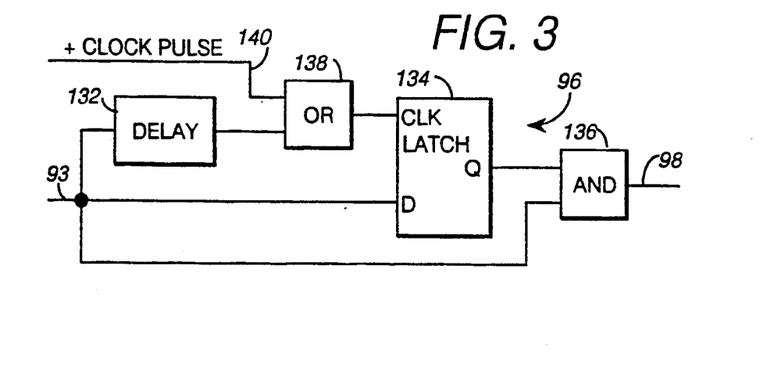
FIG. 3 is a logic diagram of a glitch reject circuit shown in FIG. 2.
Figure 5:
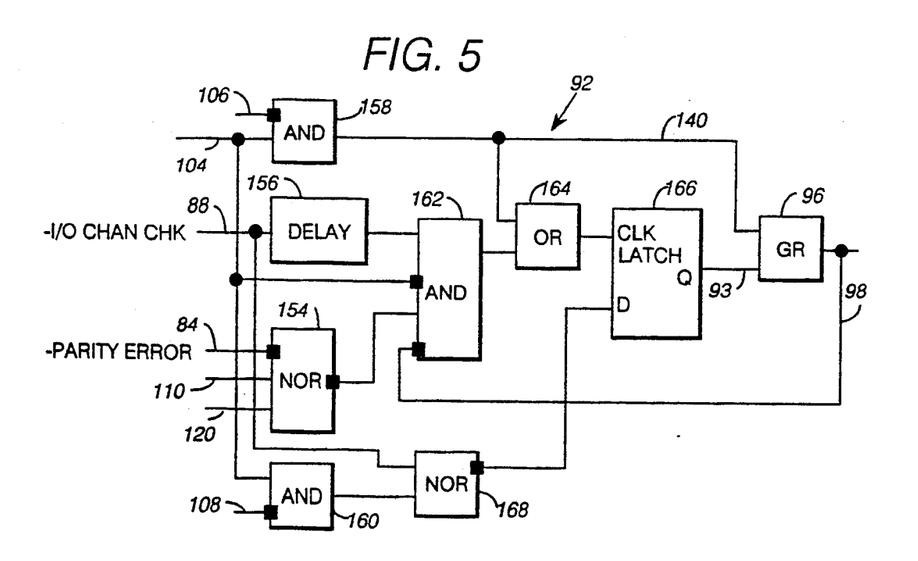
FIG. 5 is a logic diagram of a detector shown in FIG. 2.

Referring to FIG. 3, glitch reject circuit 96 has an input line 93 connected to the output of detector 92. Line 93 is further connected to a delay circuit 132, to the data line D of a latch 134, and to an AND gate 136. An OR gate 138 has an input connected to the output of delay 132 and a second input 140 for receiving a CLOCK PULSE signal generated by AND gate 158 (FIG. 5). The output of gate 138 is connected to the clock input CLK of latch 138. The output of latch 134 is connected to a second input of gate 136 whose output line 98 is connected to an input of read back register 100, as shown in FIG. 2. In case of a valid I/O CHAN CHK, line 93 is high, the delayed output into OR gate 138 will set latch 134 whereby the output from latch 134 is anded with line 93 by AND gate 136. This causes line 98 to go high. If an incoming pulse on line 93 is shorter than the length of delays in 132 and 138, latch 134 will not be set and the pulse will not appear on line 98. The net effect is that all pulses shorter than a period substantially the same as the delay determined by delay 132, are rejected.

Figure 4:
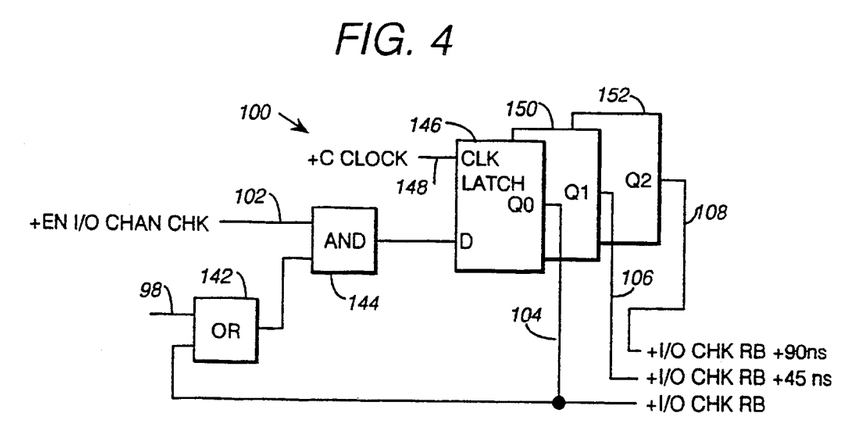
FIG. 4 is a logic diagram of a read back register shown in FIG. 2.

As shown in FIG. 4, read back register 100 has an OR gate 142 connected to line 98. A second input to gate 142 receives a feedback signal on line 104 from the output of a latch 146. The output of gate 142 is fed to one input of an AND gate 144 having one other input connected to line 102 to receive enabling signal +EN I/O CHAN CHK. The output of gate 144 is connected to the data input D of latch 146 which receives a CLK input on line 148 from +C CLOCK. Latch 146 is set upon receiving a positive going C CLOCK pulse and an active D input, to produce a read back bit signal +I/O CHK RB. Two additional latches 150 and 152 are cascaded with latch 146 to produce two additional output signals +I/O CHK RB +45 ns and +I/O CHK RB +90 ns on lines 106 and 108, which signals are spaced 45 ns apart from each preceding latch 146 and 150 output, as best seen in the FIG. 6 and provide timing signals for clock pulse generation. When port 61 is read by the system, the read back bit stored when latch 146 is set, is provided to the system as an output bit from reading port 61. In summary, read back register 100 synchronizes the output of glitch reject 96 to the C clock, it provides two signals on lines 106 and 108 for pulse generation, and it provides a read back bit that is used to generate an NMI interrupt and to determine the type of parity error causing the NMI interrupt.

Referring to FIG. 5, the general function of I/O channel check detector 92 is to detect an I/O channel check which occurs by itself (i.e. without any memory parity error) while rejecting an I/O channel check if there is a memory parity error. Detector 92 comprises a NOR gate 154 having three inputs from lines 84, 110, and 120 respectively. A delay circuit 156 is connected to line 88 for producing a delayed −I/O CHAN CHK signal that is inputted into one input of an AND gate 162 having three other inputs. One of the other inputs is from the output of NOR 154, one is line 104, and the remaining input is a feedback on line 98 from the output of glitch reject circuit (GR) 96. Line 104 is also connected as an input into an AND gate 158 that also has a second input connected to line 106. The output of gate 158 is connected by line 140 to inputs of an OR gate 164 and to GR 96 to provide a CLOCK signal thereto. Gate 164 has a second input connected to the output of gate 162 and an output that is connected to the CLK input of a latch 166. An AND gate 160 has two input lines 104 and 108 and an output connected to the input of a NOR gate 168. A second input of gate 168 is connected to line 88. The output of gate 168 is connected to the D input of latch 166. Line 93 is connected to the output Q of latch 166.

The detection paths for I/O Channel Check and Parity Error are essentially identical with the exception of NOR gate 154 in detector 92. That is, detector 94 does not have a corresponding NOR gate nor its associated lines and signals. NOR gate 154 ensures that no I/O Channel Check is detected while a Parity Error is active (−PARITY ERROR), the corresponding output on line 110 from GR 107 is high, or the Parity Error Read Back bit in register 112 (equivalent to Q0 of register 146) is set. Any one of these three conditions disables the clock input to latch 166 in detector 92. The output of AND gate 158 is inactive.

Referring back to FIG. 2, the parity detection path includes detector 94 having an output 105 connected to glitch reject circuit 107. Circuit 107 has an output connected to line 110 that is inputted into a read back register 112 and to detector 92 as previously described. Register 112 receives on line 114 an enabling signal +EN PAR CHK. Output line 120 of register 112 is connected as an input into detector 92 and into OR gate 122. Line 104 is connected to the second input of gate 122. The output of gate 122 is connected to one input of NAND gate 126 which has a second input 128 for receiving an NMI masking signal −NMI MASK from a conventional masking port (not shown). The output of gate 126 produces on line 130 a −NMI signal that is fed back to microprocessor 12 (FIG. 1) for handling in normal fashion. When port 61 is read, the read back bits in registers 100 and 112 are driven onto the data bus so that the cpu can determine the source of the error (memory or channel) while handling the NMI interrupt.

At the beginning of operation, it is assumed that no Parity Error and I/O Channel Check have occurred, and that all latches are in their reset states, and that the enabling signals on lines 102 and 114 are active. Under such conditions, the output of OR gate 164 is high thereby placing latch 166 in a flush mode whereby the output of the latch follows the data input. Simultaneously, the output of NOR gate 168 is low and line 93 from of latch 166 is forced to zero. The zero is propagated to read back register 100. Similar conditions exist in detector 94.

If −I/O CHAN CHK goes low (active) the output of NOR gate 168 goes high, and since latch 166 is in the flush mode, line 93 goes high. In addition, the outputs of the DELAY 156 goes low, AND gate 162 and OR gate 164 go to zero, and the CLK input of latch 166 goes low thus latching in latch 166 the one propagated through NOR gate 168. The DELAY 156 ensures that the latch remains in the flush mode until the one has propagated to the latch. The DELAY 156 in conjunction with the delays through the other logic blocks and the interconnection delays determines the minimum pulse width detected reliably.

If the pulse on −I/O CHAN CHK is too narrow the data input of latch 166 is low again by the time the clock input goes high. However, since the glitch propagates through latch 166 while it is transparent, glitch reject 96 rejects such glitch and thereby avoids latching a glitch into the read back register 146 when it coincides with the C Clock. The output of latch 166 is fed directly to the data input of latch 134 and through delay 132 and OR gate 138 to the clock input of latch 134. If the pulse has a duration of less than the propagation delay through delay 132 a true input would never be latched as high. AND gate 136 ensures that the glitch does not propagate to read back register 100.

In detector 92, a valid I/O Channel Check signal has sufficient duration such that $t156 + t162 + t164 - t160 - t168 - ts166 < tw$, where tn represents the delay through each correspondingly numbered logic block INCLUDING WIRING DELAYS, ts is defined as the set up time of latch 166, and tw is the pulse width of +I/O CHAN CHK. If the sum of the delays is greater than tw, the pulse is considered a glitch and it is not latched into the detector. If both sides of the equation are equal, the resulting metastablity will either latch a valid I/O channel check or a glitch, thus yielding unpredictable results. The specification of the pulse width to be detected is chosen such that a valid signal is clearly distinguished from a glitch. Delay 156 substantially determines the minimum pulse width to be latched and thereby detected, and such delay can be set as low as about 10 ns for current CMOS technology. In order not to be rejected by GR 96, the pulse on line 93 must satisfy the following equation: $t132 + t138 - ts134 < tw166$.

When a valid I/O Channel Check is received, the output of NOR gate 168 goes high. Since latch 166 is transparent, line 93 goes high. Once I/O Channel Check propagates through DELAY 156, AND gate 162, and OR gate 164, latch 166 latches the one at its output Q. The output of latch 166 is connected to the data input of latch 134 and one input of AND gate 136. Once the output of latch 166 propagates through DELAY 132 and OR gate 138, latch 134 becomes transparent and its output then drives AND gate 136 high. Register 146 then stores the one on the next C Clock. Registers 150 and 152 delay Q0 by one clock cycle each. By ANDing Q0 and the invert of Q1 at AND gate 158, +CLOCK PULSE is generated on line 140 that clocks latches 166 and 134. Simultaneously, AND gate 160 combines Q0 and the invert of Q2 pulling the output of NOR gate 168 low. Thus, latches 166 and 134 are both cleared and the detection and glitch reject circuits are rearmed. However, as long as +I/O CHK RB is high on line 104, AND gate 162 remains low and thus the clock of latch 166 is prevented from being activated again until +I/O CHK RB is cleared by an I/O write to port 61.

Figure 6:
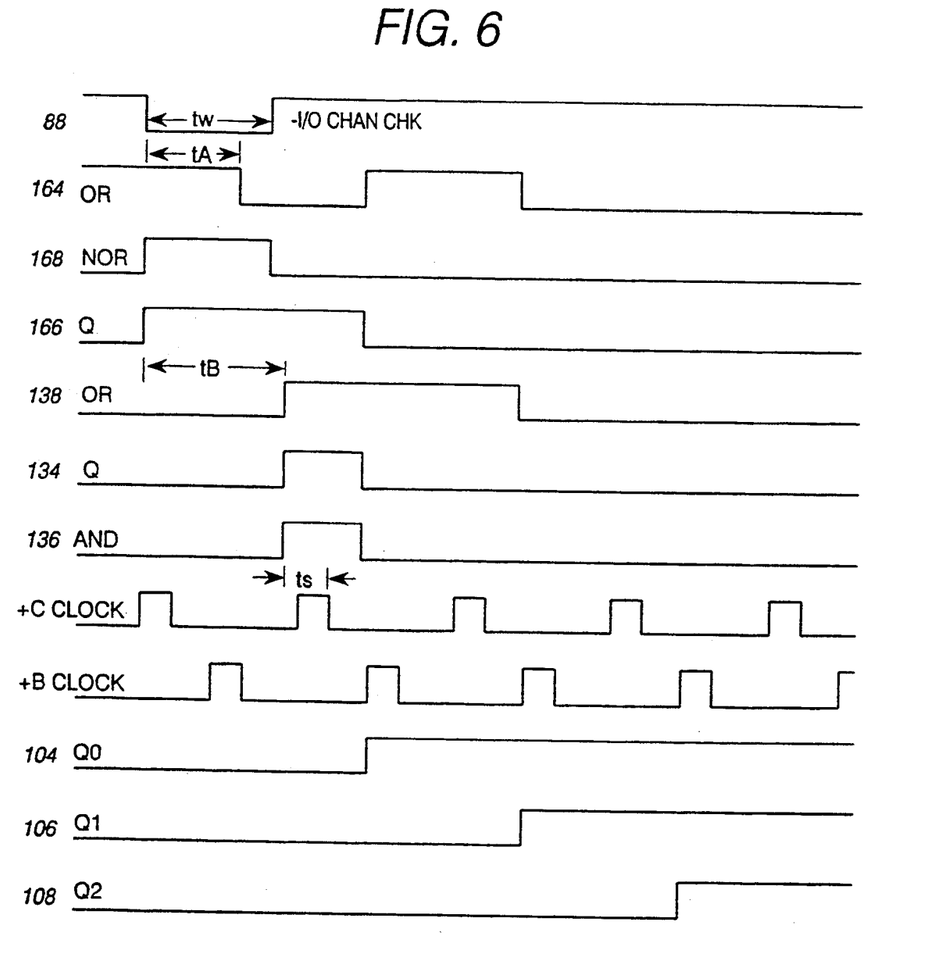
FIG. 6 is a timing diagram showing synchronous channel check.
Figure 7:
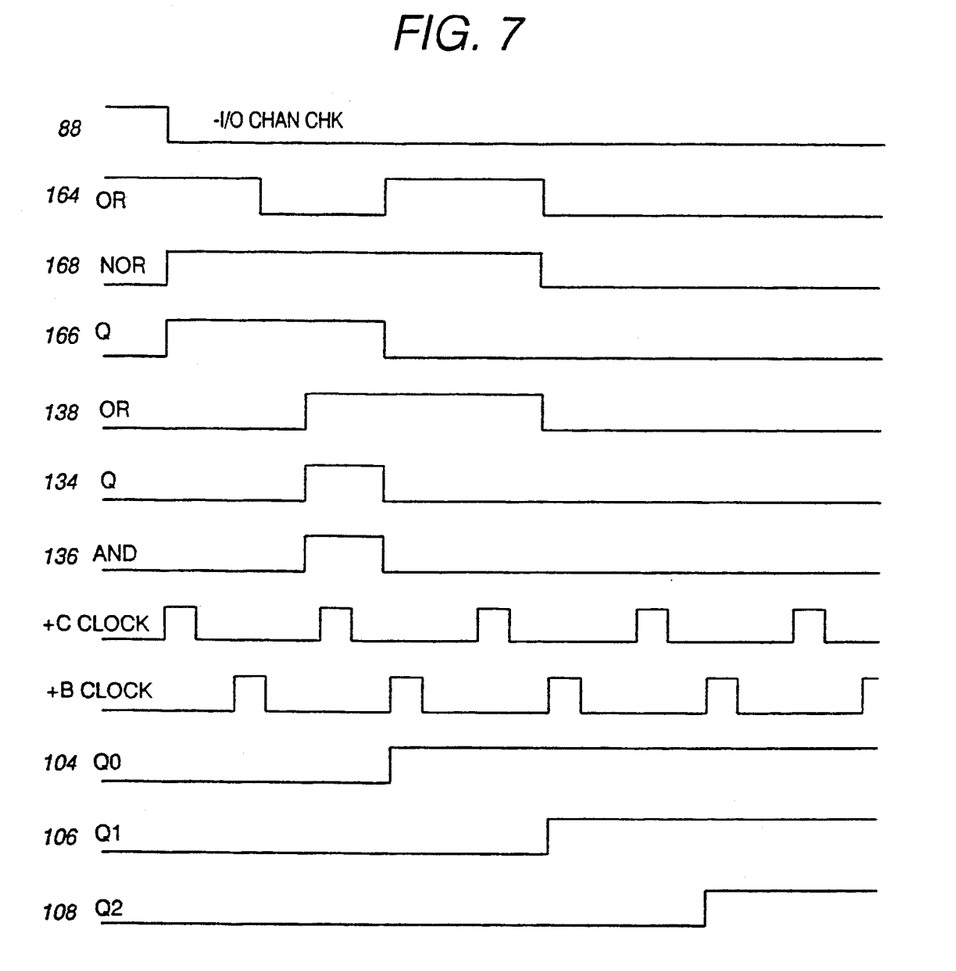
FIG. 7 is a timing diagram showing asynchronous channel check.

With reference to the timing diagrams, the numerals and legends at the left ends of the signals represent the lines on which such signals appear. FIGS. 6 and 7 show timing diagrams for valid synchronous and asynchronous I/O Channel Checks respectively. In FIG. 6, the I/O CHAN CHK signal is a pulse that is synchronous with the transfer of data in the channel. In FIG. 7, such signal is asynchronous with the transfer of data in the channel and remains valid until the I/O channel check signal is cleared at its source by the system master. Time tA equals the delays through 156, 162, and 164. Time tB is the sum of the delays through 132 and 138. Time ts is defined to be the setup time of the output of AND gate 136 to the falling edge of the next C Clock. Delay through the other circuits are ignored for simplicity of illustration. The C CLOCK pulses come from the main clock in IOC 46, and the B CLOCK pulses are derived therefrom and have a delay relative thereto, as shown.

Figure 8:
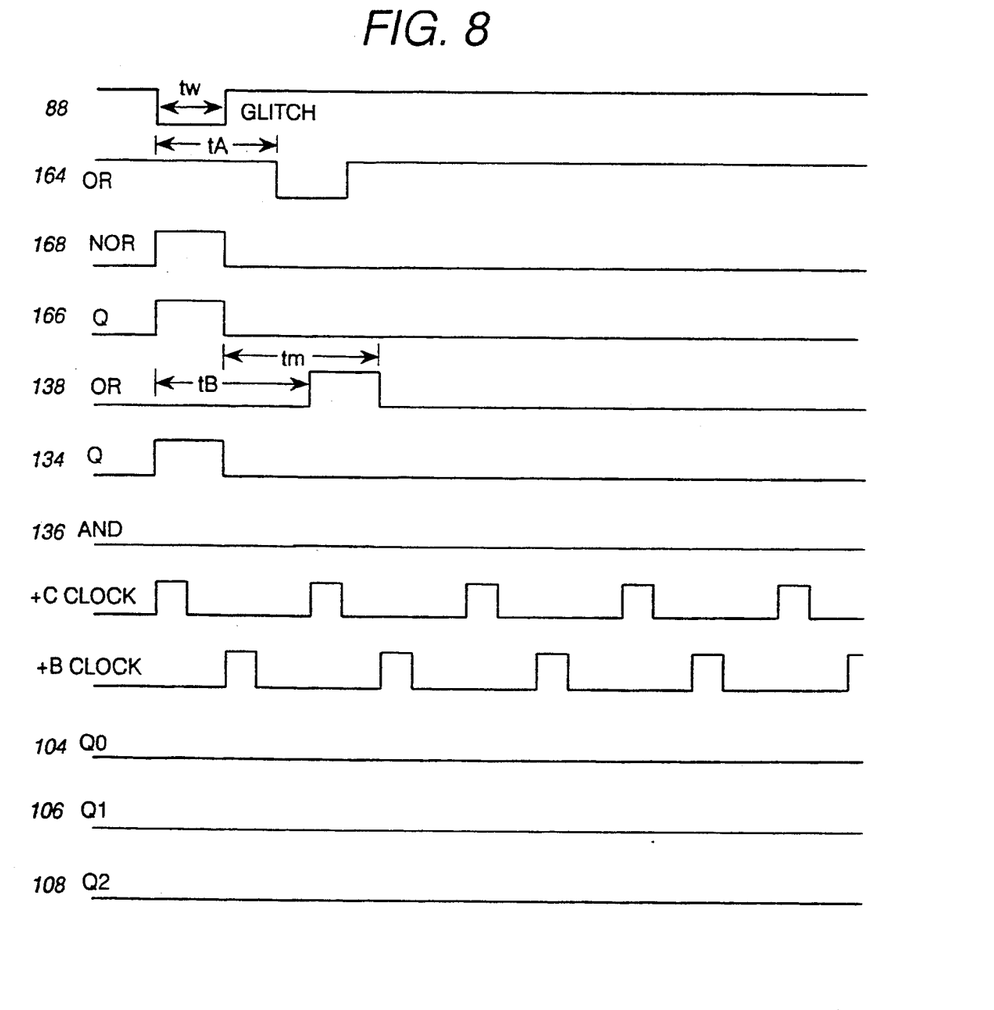
FIG. 8 is a timing diagram showing glitch rejection.

FIG. 8 shows a glitch of less duration than the delay of 156 and even though Q 166 pulses high, the glitch reject delay 132 prevents the glitch to appear at the output of AND gate 136. It may be observed that the pulse at the data line of latch 134 is missed by the clock pulse by margin tm. Hence the I/O Check read back bit is not set.

In summary, the invention provides a new detection circuit for I/O channel check and parity error was developed. Synchronous and Asynchronous I/O channel check and parity error are supported with the same detection circuit. Detection is achieved with no system clock dependency. A glitch reject circuit rejects pulses below a predetermined minimum width. Output of a read back register is synchronized to a system clock. LSSD testability problems are not introduced. Compatibility with previous systems is maintained.

It should be apparent to those skilled in the art that many changes can be made in the details and arrangements of steps and parts without departing from the scope of the invention as defined in the appended claims.

What is claimed is:

1. In a personal computer having a first parity detector for detecting parity errors while transferring data in a memory and generating PARITY ERROR signals in response thereto, and a second parity detector for detecting parity errors while transferring data in an I/O channel and generating I/O CHAN CHK signals in response thereto, and an I/O controller for receiving said PARITY ERROR signals and said I/O CHAN CHK signals, said controller comprising an I/O channel check and parity check detector comprising:
   a parity check detector having a first input line connected to receive said PARITY ERROR signals;
   a channel check detector having a second input line connected to receive said I/O CHAN CHK signals, said channel check detector being also connected to said first input line to receive said PARITY ERROR signals;
   first and second read back registers;
   first and second glitch reject circuits connected between said detectors and said read back registers for transmitting pulses from said detectors to said registers which pulses have widths greater than a predetermined value and rejecting pulses from said detectors having widths less than said predetermined value;
   said first read back register having a first latch settable in response to receiving a pulse from said first glitch reject circuit to provide a read back bit signifying receipt of an I/O CHAN CHK signal by said channel detector; and
   said second read back register having a first latch settable in response to receiving a pulse from said second glitch reject circuit to provide a read back bit signifying receipt of an PARITY ERROR signal by said parity error detector.

2. A personal computer in accordance with claim 1, wherein said feedback registers are selectively enabled, and said computer includes means for transmitting enabling signals to said read back registers.

3. A personal computer in accordance with claim 1 comprising:
   logic means connected to said read back registers and being operable in response to either one of said latches being set to generate a non-maskable interrupt signal.

4. A personal computer in accordance with claim 1 wherein said channel check detector comprises:
   logic means responsive to receiving only an I/O CHAN CHK signal to transmit a pulse indicative thereof to said first glitch reject circuit to set said first read back register, said logic means being operable in response to receiving I/O CHAN CHK signal and PARITY ERROR signal to reject such I/O CHAN CHK signal.

5. A personal computer in accordance with claim 4 wherein said I/O controller comprises a programmable peripheral controller port that is selectively readable and writable, said port being operative when read to transmit said read back bits.

6. A personal computer in accordance with claim 5 wherein said port is operable when written into to reset said read back registers.

7. A personal computer in accordance with claim 1 wherein said I/O CHAN CHK signals occur both synchronously and asynchronously with I/O data transfers.

* * * * *